July 17, 1973   R. N. BATESON ETAL   3,746,546
APPARATUS AND PROCESS FOR PUFFING FOOD PRODUCTS
Filed Dec. 11, 1970   3 Sheets-Sheet 1
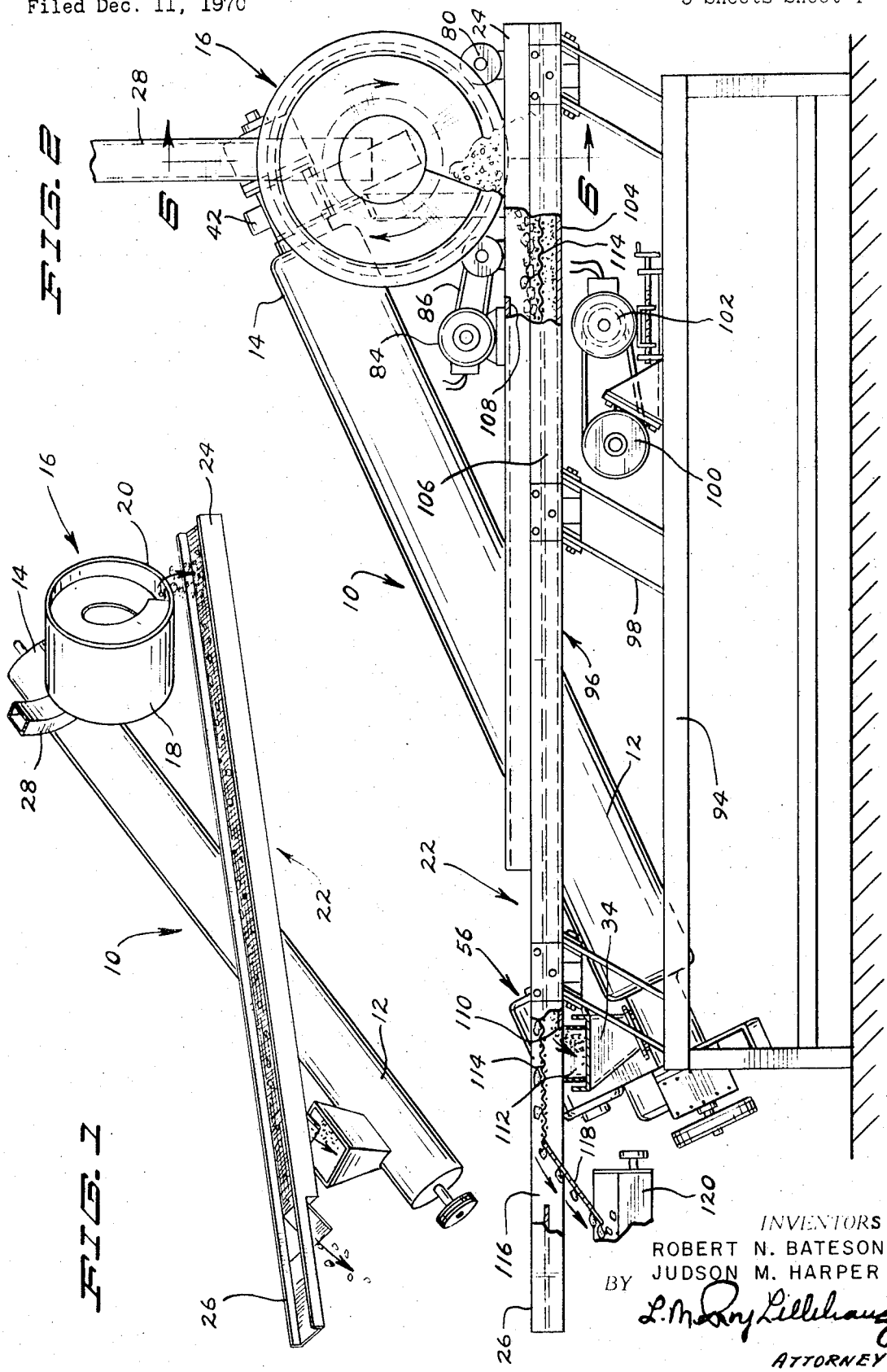
INVENTORS
ROBERT N. BATESON
JUDSON M. HARPER
BY
ATTORNEY

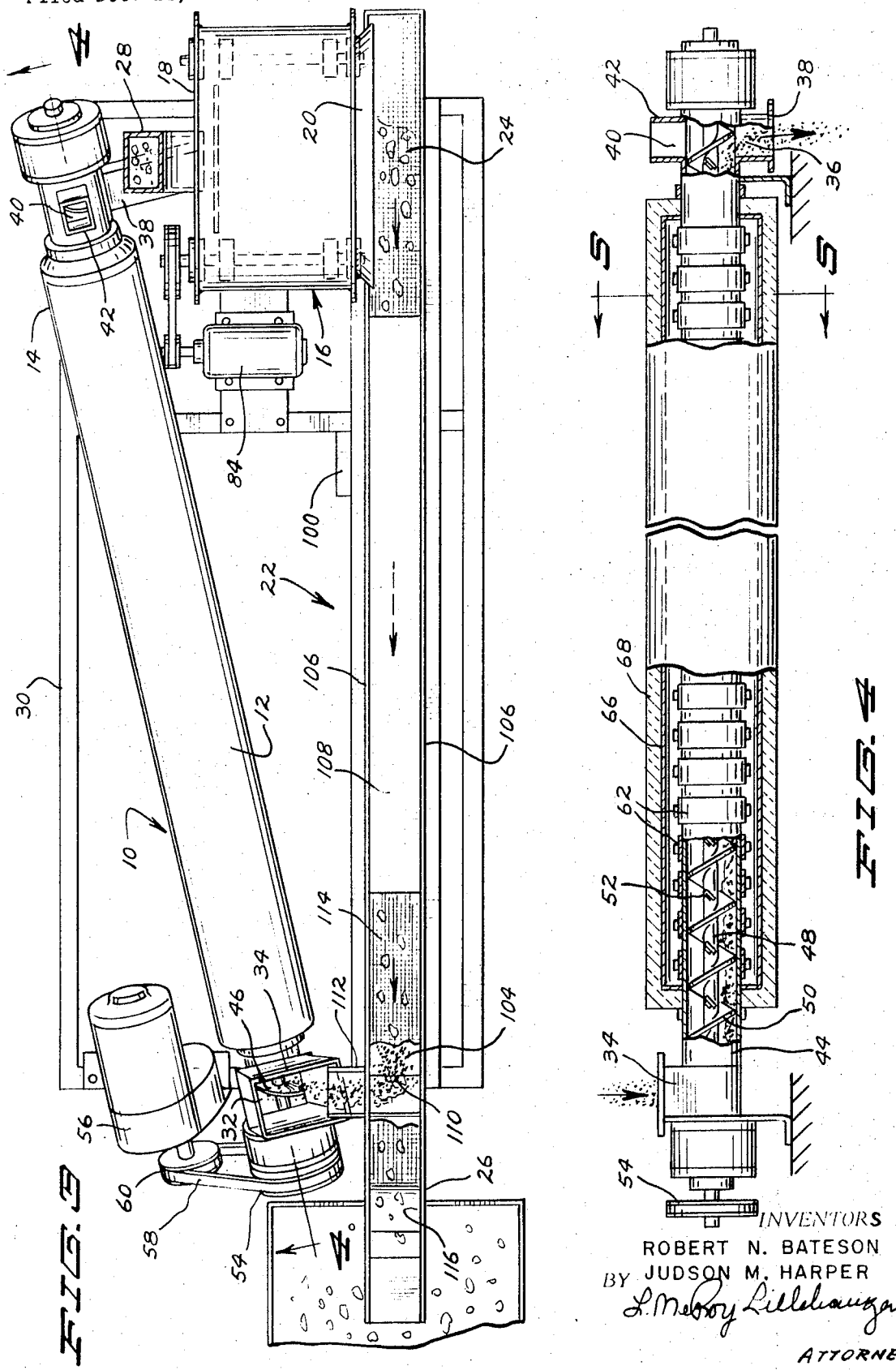

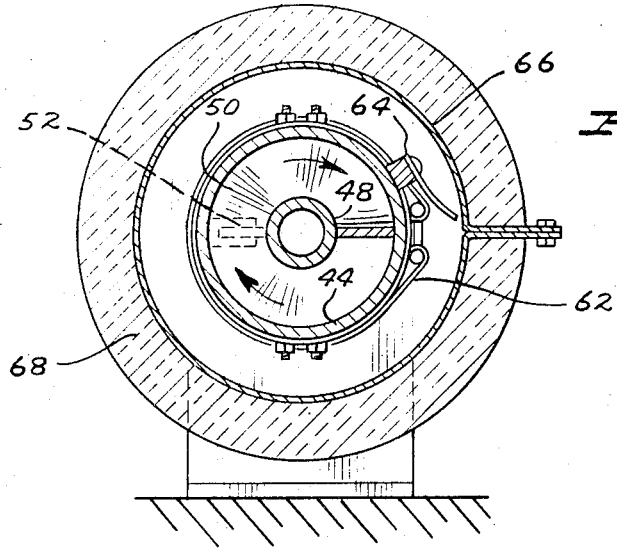
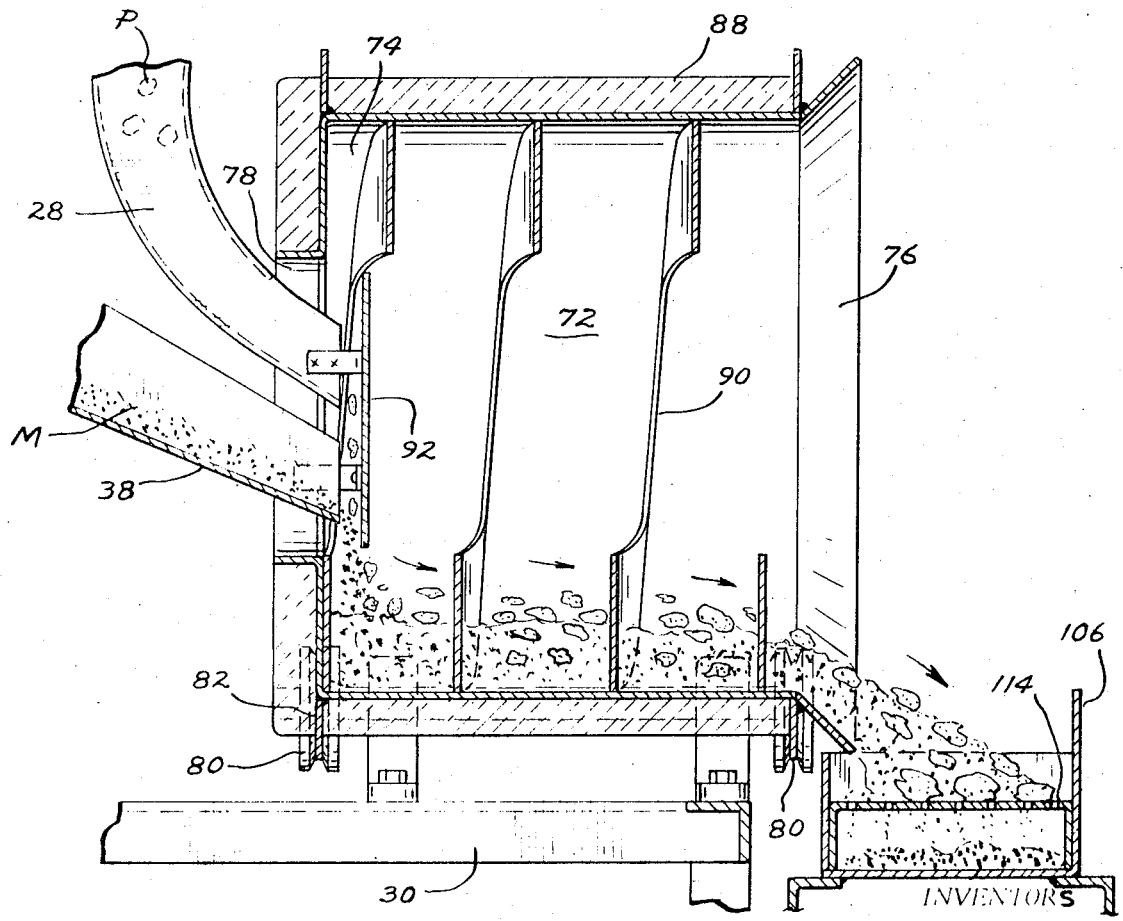

United States Patent Office 3,746,546
Patented July 17, 1973

3,746,546
APPARATUS AND PROCESS FOR PUFFING FOOD PRODUCTS
Robert N. Bateson, Minneapolis, Minn., and Judson M. Harper, Fort Collins, Colo., assignors to General Mills, Inc.
Filed Dec. 11, 1970, Ser. No. 97,238
Int. Cl. A23l 1/18
U.S. Cl. 99—81                                         14 Claims

ABSTRACT OF THE DISCLOSURE

An apparatus and process for continuously puffing pieces of food product with a heated granular material. The granular material is first heated, and then introduced into a puffing chamber along with the product to be puffed. As the product and the heated granular material are mixed together, heat is transferred to the product so that it puffs or expands in size. Thereafter, the product is separated from the granular material, the latter being reheated and again used for puffing additional product.

---

The present invention relates to an apparatus and process for treating food products, and more particularly to an apparatus and process for puffing food products, by heating the product in contact with granular material having an elevated temperature.

Nnumerous attempts and approaches have been made to design and develop devices and procedures for expanding or puffing food products by subjecting them to heat. A primary objective is to obtain a uniform application of heat to the food product. Such uniform application of heat to the product however, is ofttimes difficult to attain in a continuous heating apparatus, because portions of food products which are close to the heat source, tend to be heated to higher temperatures than those which enter the apparatus relatively remote from the heat source. This non-uniform application of heat tends to overcook some of the product, while some of the product remains relatively uncooked.

According to the known prior art, deep fat frying procedures or puffing gun techniques are well known for cooking and puffing cereal type food products; in many instances however, such procedures and techniques have not been completely satisfactory and appropriate for making certain types of food products. The usual deep fat fryer provides an efficient means for applying heat uniformly to the food product, since the fat completely surrounds the food product and thereby applies the heat uniformly over the entire surface of the product. This however, usually results in an end product having a high fat content, and other features not always acceptable for some products. It has been found that simulating this type of heat application with other efficient heat transfer systems is quite difficult, especially in a continuous operation.

As known, an efficient heat transfer medium such as salt, can be used to avoid the presence of fat in the frying operation. Due to the difference in the specific gravity of the food product relative to that of the granular material, certain problems result which affect the application of heat to the product. The relatively light food product is often difficult to intermix with the relatively dense granular material, especially in a continuous operation. Accordingly, past practices have not provided entirely satisfactory methods for utilizing a granular material for the puffing and cooking of food products. Some past practices involve intermixing a batch of food with a batch of granular material and repeating this batch operation over and over. This however, is both inefficient and time consuming, and not very satisfactory.

Another method of utilizing granular material has been the use of the material in a fluidized bed. In such an instance, air used to fluidize the granular material, forms part of the heat transfer medium; air however, is not a very efficient heat transfer medium. A related system is that utilized wherein the granular material is dropped past the food product and random contact between the granular material and the food product results in heating of the food product. In such a system however, the food product is not surrounded by the granular material.

A more recent development known to those in the art, involves the use of an apparatus in which a reservoir of granular heat transferring material, such as salt, is retained within a rotatable puffing chamber having a perforated helical member fixidly mounted therein. As heat is applied to the exterior surface of the chamber, the granular material, as well as the chamber surface, is heated to an elevated temperature. Product to be heat treated, is introduced into the rotating chamber and it is mixed with the granular material and caused to advance to a discharge opening in the chamber, by means of the perforated helical member as the chamber rotates about its longitudinal axis. The salt however, is retained within the chamber and the chamber is constantly subjected to heat so as to maintain the temperature of the salt at an elevated level.

While the above device and technique has been used with quite satisfactory results, it also has been found to have certain shortcomings and disadvantages which affect the quality of the puffed product. One of the main disadvantages is that in view of direct heating of the chamber, the chamber walls become very hot, and there is a tendency for the product to become scorched if it comes in contact with this hot surface. Another disadvantage is that some of the smaller product has a tendency to get caught in the perforations in the helix, as a result, it has a tendency to become burned. Furthermore, since the chamber includes a relatively large radiating surface, and since heat is applied to only a small amount of the heating surface, the thermal efficiency is quite low, because only a small amount of the applied heat goes to the heating and evaporation of moisture from the product; the rest being lost to the environment.

Accordingly, one object of the present invention is to provide an improved apparatus for treating food products.

Another object is to provide an improved apparatus for puffing food products in the presence of a granular heat-transferring material, such material having an elevated temperature.

A further object is to provide an improved apparatus having greater efficiency for puffing food products wherein a granular heat-transferring material is heated, after which it is intimately mixed with the food product.

A still further object is to provide improved structure wherein particles of salt are heated to an elevated temperature, after which it is intimately mixed with a food product so as to submerge the product in the salt, thus raising the temperature of the food product to such a magnitude that it becomes puffed or expanded.

Another object is to provide a novel process for heat treating food products.

A further object is to provide a process for puffing food products by intimately mixing such products with a granular, heat-transferring material which has been heated prior to mixing it with the product.

A still further object is to provide a continuous process for treating a food product by heating particles of salt, intimately mixing the heated salt with the food product so that such product is submerged in the salt, separating the salt from the product, and returning the salt to the source of heat for subsequent re-use.

Other objects and advantages will become apparent from a consideration of the following specification and accompanying drawings. Before proceeding with a detailed description of the invention however, a brief description of it will be presented.

Generally, the invention involves an apparatus for puffing or expanding food products, such as pellets or flakes of a cereal dough, cereal grains, and similar food products. The apparatus includes a heating chamber into which a granular heat-transferring material, such as salt, is continuously introduced and heated to an elevated temperature. After heating, the granular material is discharged from the heating chamber and introduced into a puffing chamber, along with the product to be puffed, such product being conveyed from a storage bin or the like. The product and the granular material are intimately mixed within the puffing chamber so that the product is submerged in the heated material. After being heated for a prescribed period of time, the product and the granular material are discharged into a separation device so that the food product is removed from the granular material. After separation, the granular material is returned to the heating chamber for re-heating and further use. The invention also concerns a continuous process for puffing food products wherein the food product is introduced into a puffing chamber along with a granular, heat-transferring material which has been heated to an elevated temperature. While in the puffing chamber, the product is mixed with, submerged in, and surrounded by the granular material so that it is caused to expand or puff to a desired extent, without burning or charring the individual pieces. After removal from the chamber, the product is separated from the granular material and the material is returned to a heating chamber for subsequent re-use.

The invention will best be understood by reference to the following drawings, wherein;

FIG. 1 is a schematic perspective view illustrating the three main components of the invention, including a heating chamber, a puffing chamber and a separating device;

FIG. 2 is a front elevational view which illustrates the components of the invention in greater detail;

FIG. 3 is a top plan view of the structure depicted in FIG. 2;

FIG. 4 is a partial sectional view taken along line 4—4 of FIG. 3, which illustrates the internal structure of the heating chamber in greater detail;

FIG. 5 is an enlarged sectional view taken along line 5—5 of FIG. 4; and

FIG. 6 is an enlarged partial sectional view illustrating the puffing chamber in greater detail.

FIG. 1 schematically illustrates a continuous system for treating a food product with a heated granular material, such as salt. As shown, the system includes three main components, such components including an elongated heating chamber designated generally by numeral 10, having a first or inlet end 12 and a second or discharge end 14, in which the granular material is heated; a rotatable puffing chamber designated by numeral 16, having a base end 18 and a discharge end 20; and an elongated separating device designated by numeral 22, having a first or inlet end 24 and a second or discharge end 26. As shown, the puffing chamber 16 is positioned proximate the discharge end 14 of the heating chamber, and the granular material is introduced from the heating chamber 10 into the base end 18 of the puffing chamber. In addition, product to be treated is also introduced into the chamber 16 through a spout or conduit 28 which is connected to an appropriate storage receptacle (not shown). As the chamber 16 rotates, the product is expelled from the end 20 onto the separating device 22, at which point the product is separated from the granular material, the latter being returned into the inlet end 12 of the heating chamber.

FIGS. 2–6 illustrate the invention in greater detail. As shown, the elongated heating chamber 10 is inclined with respect to a horizontal axis, so that the discharge end 14 is elevated with respect to the inlet end 12. While no specific angle of inclination is essential, angles of 20°–40° with respect to a horizontal axis have been used, although angles outside this range might be used as well. It might be pointed out that inclining the barrel at a prescribed angle causes the granular material to substantially fill, or choke, the barrel, so that the barrel is as uniformly heated as possible. A frame 30 is provided for maintaining the chamber 10 in its desired position and relationship with respect to the other components. The inlet end 12 is provided with an opening 32, which is surrounded by a chute or guide member 34. The discharge end 14 is provided with a first opening 36 which is surrounded by a spout or conduit 38, and a second opening 40 surrounded by a conduit 42.

As depicted more fully in FIG. 4, the heating chamber 10 includes an elongated barrel 44 having a circular cross section. Rotatably mounted within the barrel 44 is a close fitting screw or auger 46 which includes a central shaft 48 having a continuous helix 50 secured thereto. The shaft 48 is journaled at its ends in appropriate housing means (not shown in detail). A plurality of paddles 52 are secured axially to the shaft 48 so that they project radially away from the shaft axis, and they aid in breaking up the material and advancing it within the chamber as the auger 46 rotates. A pulley 54 is fixedly connected to the auger shaft 48, proximate the inlet end of the heating chamber 10, and it is operatively connected to a motor 56 mounted on the frame 30, by means of a drive belt 58 and drive pulley 60.

A plurality of electric heating bands 62 are clamped around the barrel 44, for heating the barrel and its contents. Electric heating bands of this type are commercially available items and will not be described in detail. Edwin L. Wiegand Company of Pittsburgh, Pa., and Watlow Electric Manufacturing Co. of St. Louis, Mo. for example, are two companies which manufacture heating units of this type which might be satisfactorily used. Generally, the heating bands are divided into three heating zones, each zone including more than one heating band and being provided with its own temperature control, as well as a thermocouple 64 for sensing the temperature. In this regard, note FIG. 5 as well. If preferred of course, each heating band might be provided with its own temperature control and thermocouple. A sheet metal covering 66 surrounds the heating bands, and it in turn is covered or surrounded by a layer of insulating material 68. An appropriate passage (not shown) provides an opening for electrical conduits which connect the heating bands 62 to a source of electrical energy.

The puffing chamber 16 is quite similar to a puffing apparatus disclosed in Pat. No. 3,253,533, Benson, Puffing Food Products, in that it includes a somewhat cup-shaped cylindrical container 72 having a base end 74 and an open or discharge end which culminates with a flanged member 76. As shown, the diameter of the chamber is somewhat larger than its length, and it is orientated so that it rotates about a generally horizontal axis. As shown, the chamber 16 is positioned proximate the discharge end 14 of the heating chamber, and it is secured to the frame 30 by an appropriate means, so that it is elevated. The base end 74 is provided with an opening 78 which permits granular material and product to be introduced into the chamber. The puffing chamber 16 is caused to rotate by means of two pairs of rollers 80 which engage a pair of flanges 82 on the periphery of the chamber. The rollers 80 in turn are caused to rotate by means of a motor 84 and belt drive assembly 86 (note FIG. 2). A layer of insulating material 88 covers the walls of the container 72 and part of the base end 74.

A helical member 90 is rigidly connected to the inner surface of the container 72; unlike the helical member shown in the Benson patent referred to above however, it is not perforated. A circular baffle plate or disc 92 is positioned proximate the base end 74 of the container in such a manner that it is spaced from the base end a small distance, and it is positioned within the first flight of the helical member or flight 90. This baffle plate helps assure that the product and the granular material are introduced into the puffing chamber proximate the base end. A spout 28, connected to a storage bin or container (not shown) directs product to be puffed into the opening 78 of the container, in such a manner that the product impinges against the baffle plate 92 and becomes mixed with the granular material.

The separating device 22 is comprised of a vibratory apparatus which separates the puffed product from the granular material. The device 22 includes a frame 94 to which an elongated trough 96 is connected by means of a number of springs 98. An oscillator 100, actuated by a motor 102, is secured to the frame 94 for imparting vibratory movement to the trough 96. Vibratory conveyors of this type are generally well known in the art, and will not be described in further detail. Pat. No. 2,951,581, Long et al., Vibratory Conveyors, for example, illustrates and describes a two mass system of the type which might be used in the present invention with satisfactory results. It should be recognized that various other types of separating device might be used as well.

The trough 96 is generally rectangular in cross section, and it includes a bottom surface 104, side walls 106, and a top surface 108 which covers at least part of the trough. In this regard, observe that the inlet end 24 is left uncovered so that material can be deposited in the trough from the puffing chamber 16. The bottom surface 104 terminates within the trough at 110, and a chute 112 is secured to the trough so that material on the bottom surface is directed into the chute 34 secured to the heating chamber 10. A screen 114, having openings of a prescribed size, is positioned within the trough so that it is spaced a predetermined distance from the bottom surface 104. An opening 116 is formed in the screen proximate the discharge end 26, and a guide member 118 directs product from the screen onto a conveyor 120, or other apparatus for further processing.

In operation, the heating bands 62 are energized so that the barrel 44 is heated. At this point, it might be mentioned that if preferred, other types of heating devices might be used as well; it has been found however, that heating bands of the type described herein, work with excellent results. Since the system is a continuous system, all the components are actuated by their respective motors so that they are all in operation. As the granular material, designated by the letter M, is introduced into the opening 32 in the heating chamber 10, it is advanced toward the discharge end 14 by the auger 46, and it is heated to an elevated temperature. By the time the granular material reaches the discharge opening 36, its maximum temperature has been reached. Excess moisture within the chamber 10 escapes through the opening 40.

As the heated material M is discharged from the heating chamber 10, it is directed into the rotating puffing chamber 16 through the opening 78, by means of the chute 38. The food product, designated by letter P, is likewise introduced into the chamber 16 through the opening 78. As the granular material and the product drop into the puffing chamber 16, the unpuffed product intermixes with the heated granular material and is submerged and surrounded by the heated granular material. Rotation of the chamber 16, including the helical member 90, insures that the granular material and the product are in uniform physical contact for an extended period of time, thus insuring uniform heat transfer to the product. In other words, as the chamber 16 rotates, the product and the granular material travel a substantially greater distance than the mere length of the chamber, i.e., several times its circumference. Thus, an excellent job of mixing and re-mixing of the product with the granular material is obtained, which results in better heat transfer and distribution of heat. Moreover, since the granular material is relatively fine compared to the product, the material transfers heat to the product without damaging the product if it happens to be a fragile, flaky material, rather than a dough pellet or a whole cereal grain. As the chamber rotates, both the material and the product are caused to advance to the discharge end of the chamber, at which point the product has become puffed or expanded by contact with the heated granular material.

Both the material and the product are discharged from the puffing chamber 16 onto the vibratory conveyor, and more specifically, the screen 114. The granular material readily passes through the holes in the screen as it is conveyed along the longitudinal axis of the trough, onto the bottom surface 104, while the puffed product remains on top of the screen. As the trough 96 is caused to vibrate, both the granular material and the puffed product are conveyed from the inlet end 24 to the discharge end 26. The granular material is returned to the heating chamber 10 by passing through the discharge opening at 110 and the chute 34, after which it is again re-heated and advanced through the barrel 44 in the same manner described hereinbefore. The puffed product on the other hand, is discharged from the screen 114 through the opening 116, after which it is cooled and/or further processed.

Generally, the above described structure can be used to puff a variety of products by considering a number of variables and employing a number of different operating conditions. While salt is preferably used as the heat transferring material, other materials such as sand, steel shot, or the like, might also be used in certain instances if preferred. There are a number of variables which control puffing quality in the puffing chamber. These variables are quite interrelated, and modification of one may make a change in one or more of the others. Generally, these variables are: the rate at which the salt travels around the system—it may be varied by the auger speed of the heating chamber; the feed rate of the unpuffed product being introduced into the puffing chamber; the temperature at the discharge end of the salt heater—this is the maximum temperature of the salt and the temperature which the product first encounters going into the puffing chamber; the retention time of the salt and the product in the puffing chamber before being discharged onto the separator—this can be varied by the rotational speed of the puffing chamber; the level of the salt in the puffing chamber—this is a function of the retention time and the salt rate; and the ratio of the salt to the product being introduced into the puffing chamber.

It has been found that optimum puffing conditions might vary quite extensively, dependent upon the specific product being puffed, the shape and thickness of the product, the moisture content of the product, the temperature of the granular material, the amount of product expansion desired, the desired color of the puffed product, and the like. Generally, the temperature of the salt should be raised to about 400° to 550° F.; if the temperature is too low, the product will not puff properly, if it is too high on the other hand, the product might tend to scorch or burn. It should be recognized of course, that the temperature of the salt drops after it becomes mixed with the product in the puffing chamber; generally, the salt should have a temperature of about 375° to 500° F. in the puffing chamber, in order to assure good puffing. The insulation which surrounds the puffing chamber of course, aids in maintaining the salt at a desired temperature level.

The pellet moisture should generally be less than 18%, and more preferably in a range of about 7–13%. The moisture content of the puffed product on the other hand, should range from about 1–4%. If the product is merely to be dried however, higher moisture contents might be tolerated.

The retention time of the pellets within the puffing chamber should range from about 6–20 seconds. Retention time is the period of time which the product remains in the chamber 16, submerged in the bed of granular material. The rate of rotation of the chamber 16 is co-ordinated with the pitch of the helical member 90 to vary the retention time of the product.

While the feed rate of the salt to the product can vary, it has been found that for a product feed rate of about one pound per minute, the salt feed rate might vary from about 20–40 pounds per minute. Generally, the rate at which salt is circulated through the system should be at a minimum to reduce handling problems, such as the mechanical action on the salt; such mechanical action tends to grind the salt into finer particles. Moreover, a higher salt rate tends to cause a greater amount of dusting of salt fines in the atmosphere as the salt is transferred from one piece of equipment to the other. It might be pointed out that the product feed rate is to some extent, dependent upon the capacity of the puffing chamber, and more specifically the depth of the helical member 90. As the food puffs or expands, it tends to rise to the top of the salt and occupy a larger volume. Thus, if the product rate is too high, the puffed product tends to overflow the top of the flight, either backwards or forwards, into another section of the flight, thus changing the residence time and reducing the product uniformity. On the other hand, if the salt product ratio is too low, the temperature drop in the puffing chamber may be too great; as a result, some of the pieces may not puff properly.

It should be recognized of course, that the above ranges, feed rates, etc., are merely those which have been used for certain products and with certain size equipment, and that specific operating conditions other than those recited above might be effectively used as well.

The invention will be better understood by reference to the following examples:

EXAMPLE I

Salt was heated in an insulated heating chamber comprised of a heated barrel having a 6 inch diameter and a length of 112 inches. A close fitting screw within the barrel was rotated at about 28 r.p.m. The barrel was heated to a temperature of about 540° F., and the temperature of the salt was raised to about 500° F., as it was discharged into an insulated puffing chamber, at a feed rate of about 90 pounds per minute. The puffing chamber had a diameter of 24 inches and a length of 18 inches, and the helical member had a pitch of 4 inches; the puffing chamber was rotated at 16 r.p.m. Pellets of unpuffed product having a moisture content of about 11%, were introduced into the puffing chamber at a feed rate of 3 pounds per minute; thus, the salt to product ratio was about 30:1. As the puffing chamber was rotated, the product became mixed and submerged in the salt, and both the salt and the product were advanced to the discharge end of the chamber and discharged onto a vibrating conveyor having a screen therein for separating the product from the salt. After separation, the salt was returned to the inlet end of the heating chamber for re-use, while the puffed product was deposited on a conveyor where it was subsequently cooled. The puffed product was retained within the puffing chamber for about 15 seconds, it had a moisture content of about 2% when it was discharged from the chamber, it had expanded about 6–8 times its original size, and it exhibited generally excellent color characteristics, with no burned or scorched puffed pieces.

EXAMPLE II

Example I was repeated except that the salt rate was changed to 40 pounds per minute, while the feed rate of the puffed product was changed to one pound per minute. Thus, the salt to product ratio was 40:1. The resulting puffed product was considered very satisfactory.

EXAMPLE III

Example I was repeated except that the salt rate was changed to 20 pounds per minute, and the feed rate of the product was changed to one pound per minute. Thus, the salt to product ratio was 20:1. The product obtained using this set of feed rates was also considered highly satisfactory.

As described above, the present invention results in an improved system for continuously puffing food products with a heated granular material. It has been found that use of the present structure produces a maximum amount of mixing and re-mixing of the heated granular material and the product; moreover, since the temperature of the inside of the puffing chamber is substantially the same as the salt temperature, a superior puffed product is obtained which is more uniform and having no charred or scorched pieces; greater thermal efficiency is obtained because more of the heat used for heating the granular material is utilized to evaporate moisture from the product: since the salt is reused, there is no salt displacement problem on start-up; and since the heating chamber is heated by a plurality of individual units, it is relatively easy to obtain and maintain a uniform inlet salt temperature into the puffing chamber.

In the above description and attached drawings, a disclosure of the principles of this invention is presented, together with some of the embodiments and examples by which the invention may be carried out.

Now therefore, we claim:

1. In combination, a heating chamber for containing a granular heat transferring material, means for continuously introducing said granular material into said chamber, means for heating said chamber thereby raising the temperature of the material therein to a prescribed level, means for continuously moving said material within said chamber and discharging said heated material from said heating chamber at a prescribed feed rate into a puffing chamber, means for continuously introducing product to be puffed into said puffing chamber independently of said granular material at a prescribed feed rate, means for intimately mixing said heated material and said product together so that said product is substantially submerged in the granular material and the temperature of said product is raised to a prescribed level, and means for continuously discharging said granular material and said product from the puffing chamber.

2. The combination of claim 1 wherein means are provided for separating the granular material from the product after it has been removed from the puffing chamber.

3. The combination of claim 2 wherein means are provided for continuously returning the separated granular material to the heating chamber for re-heating.

4. The combination of claim 3 wherein the separating means comprises an elongated vibratable conveyor having at least one screen therein upon which the granular material and the product are discharged proximate a first end thereof, the openings in said screen permitting the granular material to pass therethrough while the product remains thereon, means for vibrating said conveyor and causing the granular material and the product to advance from the first end to a second end, said granular material being discharged at a first point and said product being discharged at a second point.

5. The combination of claim 1 wherein the heating chamber is comprised of an elongated barrel having an inlet end with an inlet opening therein and a discharge end with a discharge opening therein, an auger rotatably mounted within said barrel, means for rotating said auger, and a plurality of heater units which surround said barrel, said units being spaced axially along the periphery of said barrel.

6. The combination of claim 5 wherein insulation means is provided which surrounds the major portion of the barrel and said heater units.

7. The combination of claim 5 wherein a second opening is provided proximate the discharge end of the barrel for permitting moisture to escape from said barrel.

8. The combination of claim 1 wherein the puffing chamber is comprised of a somewhat cup-shaped rotary container having an inlet opening in its base end for introducing the granular material and the product thereinto and a discharge opening at its other end, means for rotating said chamber about a horizontal axis, and a helical number mounted within said container and movable therewith for mixing said material and said product and for advancing said material and said product toward said discharge opening.

9. The combination of claim 8 wherein insulation means is provided which surrounds the exterior surface of said rotary container.

10. A process for continuously puffing food products in a bed of granular heat transferring material which comprises heating said granular material in a heating chamber to a predetermined temperature range, continuously discharging said material therefrom and continuously introducing it into a puffing chamber at a prescribed feed rate, continuously introducing the food product into said puffing chamber independently of said heated granular material, intimately mixing said product and said granular material together so that said product is substantially submerged in said granular material, the temperature of said granular material being raised to such an extent that the temperature of said product is raised sufficiently high to cause it to puff and expand in size, and continuously discharging said puffed product and said granular material from said chamber.

11. The process of claim 10 which includes separating the puffed product from the granular material, and continuously returning said granular material to said heating chamber so that said material is again heated and its temperature is again raised to an elevated level.

12. The process of claim 11 wherein the granular material is salt and it is introduced into the puffing chamber at a feed rate about 20–40 times greater than feed rate of the food product.

13. The process of claim 10 which includes introducing said granular material into an elongated heating chamber, heating the surface of said chamber with a plurality of heating units spaced along the circumference of said elongated chamber, and advancing said material within said chamber from an inlet end to a discharge end so that the temperature of said material reaches its maximum level prior to being discharged into the puffing chamber.

14. A process for continuously puffing food products having an intial moisture content of about 7 to 13% in a bed of granular heat transferring material which comprises heating said granular material in a heating chamber to a temperature of about 400° to 550° F., continuosly discharging said material therefrom and continuously introducing it into a puffing chamber at a prescribed feed rate, continuously introducing the food product into said puffing chamber independently of said heated granular material, intimately mixing said product and said granular material together so that said product is substantially submerged in said granular material, thereby raising the temperature of said product and causing it to puff and expand in size, continuously discharging said puffed product and said granular material from said chamber, the retention time of the food product within the puffing chamber ranging from about 6–20 seconds, separating the puffed product from the granular material, the moisture content of said puffed product ranging from about 1–4%, and continuously returning said granular material to said heating chamber so that said material is again heated and its temperature is again raised to an elevated level.

References Cited
UNITED STATES PATENTS

| | | | |
|---|---|---|---|
| 1,650,044 | 11/1927 | Richardson | 99—238.6 |
| 2,357,820 | 9/1944 | Hamilton | 99—238.5 |
| 3,512,989 | 5/1970 | Smith | 99—81 |
| 3,253,533 | 5/1966 | Benson | 99—81 X |

RAYMOND N. JONES, Primary Examiner

U.S. Cl. X.R.

99—323.9